United States Patent [19]

Pirs et al.

[11] Patent Number: 4,741,600
[45] Date of Patent: May 3, 1988

[54] LC MATRIX DISPLAY WITH MEASURING NET

[75] Inventors: Janez Pirs̀; Bojan Marin; Igor Musevic; Silva Pirs; Andrej Gartner, all of Ljubljana, Yugoslavia

[73] Assignee: Iskra-Sozd Elektrokovinske Industrije n.sol.o., Ljubljana, Yugoslavia

[21] Appl. No.: 927,035

[22] Filed: Nov. 5, 1986

Related U.S. Application Data

[63] Continuation-in-part of Ser. No. 648,269, Sep. 7, 1984, abandoned.

[30] Foreign Application Priority Data

Sep. 9, 1983 [YU] Yugoslavia .............. 1834/83

[51] Int. Cl.$^4$ .................................. G02F 1/133
[52] U.S. Cl. ...................... 350/336; 350/338
[58] Field of Search ............. 350/336, 338, 331 R, 350/334, 349

[56] References Cited

U.S. PATENT DOCUMENTS

| | | | |
|---|---|---|---|
| 3,597,044 | 8/1971 | Castellano | 350/349 |
| 3,675,988 | 7/1972 | Soref | 350/336 |
| 4,277,144 | 7/1981 | Saurer et al. | 350/340 |
| 4,297,022 | 10/1981 | Lester | 350/331 R |
| 4,385,805 | 5/1983 | Channin | 350/336 |
| 4,389,095 | 6/1983 | Teshimura et al. | 350/334 |
| 4,401,369 | 8/1983 | Jones | 350/349 |
| 4,636,817 | 1/1987 | Masaki | 350/336 |

FOREIGN PATENT DOCUMENTS

| | | | |
|---|---|---|---|
| 0111907 | 12/1982 | European Pat. Off. | 350/349 |
| 0089758 | 6/1982 | Japan | 350/334 |
| 0175029 | 9/1985 | Japan | 350/336 |
| 0050115 | 3/1986 | Japan | 350/336 |

OTHER PUBLICATIONS

Uchida et al., "A Full Color Matrix Liquid Crystal Display with Color Layers on the Electrodes", IEEE Trans. on Elec. Dev., vol. ED-30, No. 5, May, 1983, pp. 503–507.

Primary Examiner—Stanley D. Miller
Assistant Examiner—David Lewis
Attorney, Agent, or Firm—Fleit, Jacobson, Cohn & Price

[57] ABSTRACT

In a LC matrix display with an internal reflector and an internal measuring reticle metal electrodes made of chromium, nickel, aluminum or some other metal are used as the internal reflector. By a special configuration of electrodes it is achieved that the measuring reticle is formed in the LC layer itself as a consequence of the optical effects in the liquid crystal. By building in an internal reflector and an internal measuring reticle any parallax is removed when observing the signal curve as well as the measuring reticle and, additionally, a maximum viewing angle is assured.

2 Claims, 3 Drawing Sheets

4,741,600

LC MATRIX DISPLAY WITH MEASURING NET

This is a continuation-in-part of U.S. patent application Ser. No. 648,269 file Sept. 7, 1984, now abandoned.

BACKGROUND

The invention belongs to the field of liquid crystal (LC) matrix displays.

In known LC matrix display embodiments external coordinate axes and a measuring net are used, which substantially reduces the viewing angle of such a display and at measuring there appears a parallax.

A known embodiment of the LC matrix display with the external coordinate axes and the measuring net 6' is shown in FIG. 1, where there are represented an upper cover glass plate 1' of the display, orientation deposit layers 2', 4', a LC layer 3' with dichroic admixtures, a lower glass plate 5' of the LC cell, transparent indium-tin oxide (ITO) electrodes a', b', c', d', and reflecting lower electrodes e', which represent an internal reflector.

A considerable parallax error can appear even at a limited viewing angle $\phi$. This is evident from FIG. 1 showing the prior art LC matrix display embodiment although it is not drawn according to scale. The LC layer 3', is a hundred times thinner than the glass plate 1' and the dimensions of the electrodes a', b', c', d', e' are also substantially smaller than the dimension of the glass plate 1'.

The technical problem resides in producing a LC matrix display, wherein there is removed any parallax when observing the displayed signal curve and the measuring net, even at a considerable viewing angle.

SUMMARY OF THE INVENTION

The technical problem is solved by the present invention with a special configuration of electrodes such that the coordinate axes and the measuring net are formed in the LC layer itself and as a consequence of the electro-optical effects in the liquid crystal.

The advantage of the subject of the invention over prior art lies in that the coordinate axes and the measuring net, formed in the LC layer, and as a consequence of the electro-optical effects because of a special configuration of the electrodes, contribute to the complete removal of the parallax at measuring even at the largest achievable viewing angle.

BRIEF DESCRIPTION OF THE DRAWINGS

The subject of the invention is described in more detail and is represented in the drawings showing.

DETAILED DESCRIPTION

Figure 1:
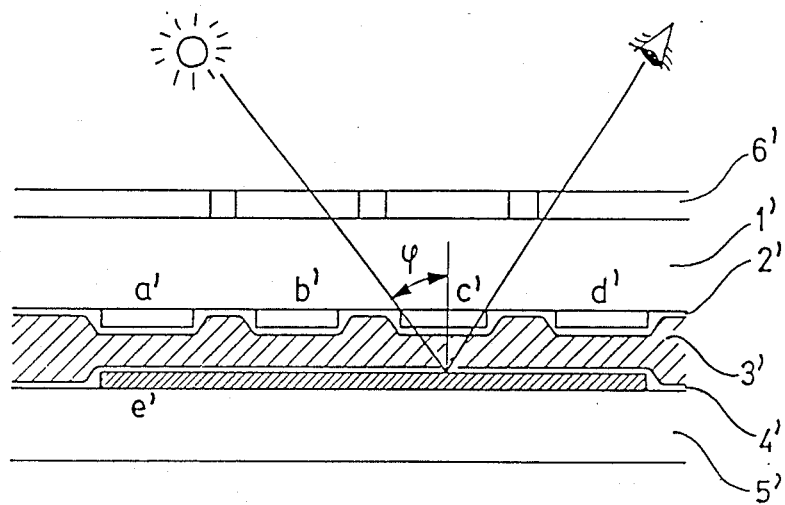
Figure 2:
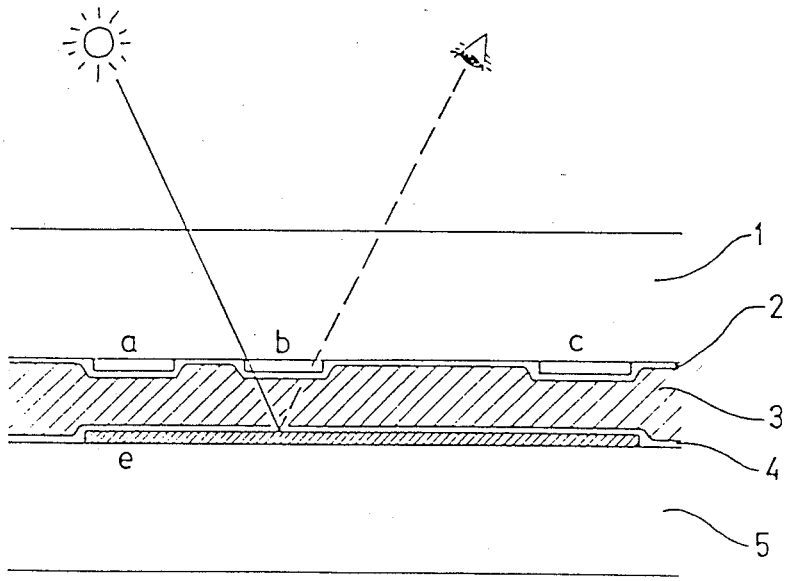
FIG. 2 is a cross section of the LC matrix display according to the invention.

FIG. 2 shows a cross section of the LC matrix display according to the invention. There is shown the upper glass plate 1 of the display, the orientation deposit layers 2, 4, the LC layer 3 with dichroic admixtures, the lower glass plate 5 of the LC display, the transparent ITO upper electrodes a, b, c and the reflecting lower electrode e. The lower electrodes are nontransparent chromium, nickel, aluminum or other metal electrodes reflecting the light and represent an internal reflector.

Figure 3:
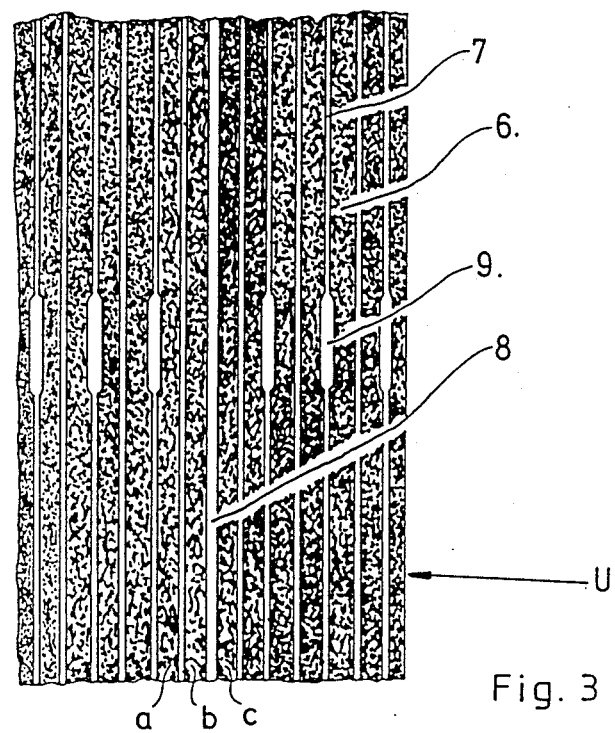
FIG. 3 is a set of transparent electrodes on the upper plate.
Figure 4:
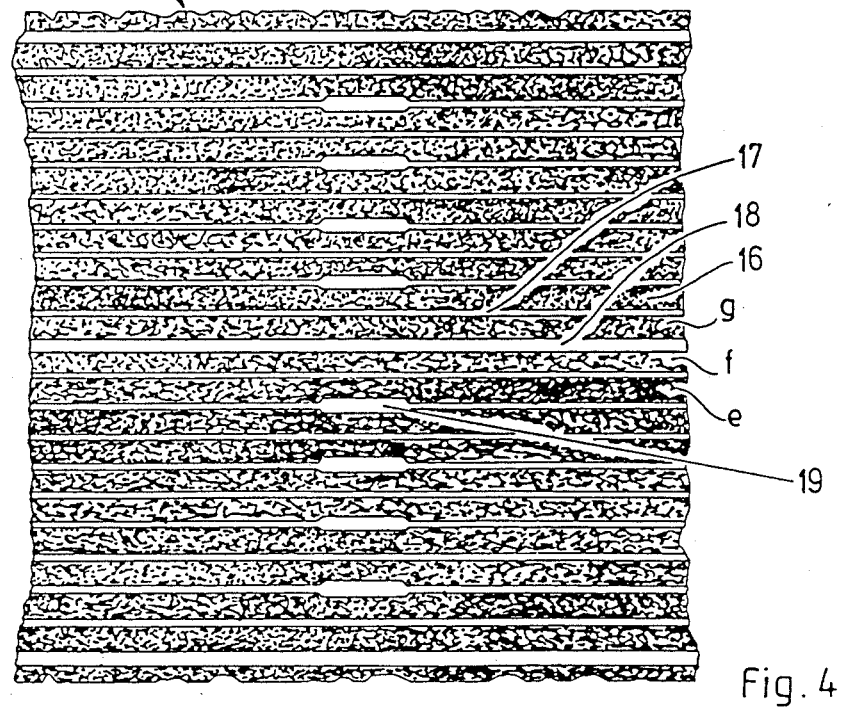
FIG. 4 is a set of reflecting electrodes on the lower plate.

The principle of forming the marked coordinate axes and the measuring net by a suitable configuration of interspaces between the electrodes is clearly seen in FIGS. 3 and 4. A set U of the transparent upper electrodes is built up on the upper glass plate 1 and a set L of the reflecting lower electrodes is built up on the lower glass plate 5. All electrodes are imbedded in the orientation deposit layer 2,4.

The electrodes (darker regions of FIGS. 3 and 4), mutually parallel in each set U and L, are substantially in the form of strips 6, 16. Electrodeless fields 9,19, however, in the upper as well as in the lower electrode set are formed by a recess of electrode margins that face each other in the middle portion of some electrode strips.

In general, interspaces 7,17 (ligher regions of FIGS. 3 and 4) between the strips 6, 16 are made so narrow that they are hardly visible. The electrodeless fields 9, 19 are formed by the electrode margins that face each other along some of said narrow interspaces 7, 17. Said fields 9, 19 are regularly spaced. The interspaces 8, 18, however, which are situated on lines X, Y, N (FIG. 5), are enlarged to such an extent that along them there appear distinctly the coordinate axes X, Y and other lines N of the measuring net.

Figure 5:
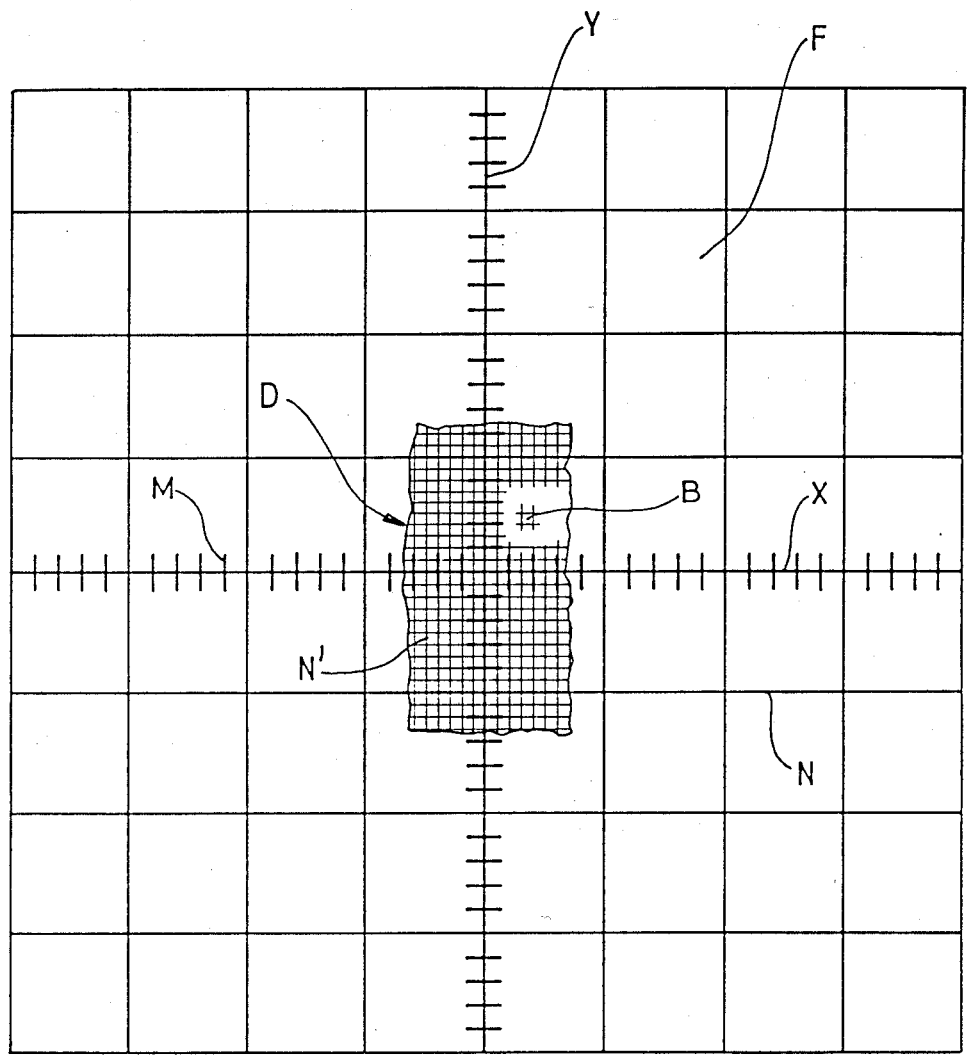
FIG. 5 is the measuring net and the coordinate axes of the LC matrix display.

The matrix display shown in FIG. 5 is formed when the glass plates 1, 5 are assembled, with the electrodes of one set oriented nonparallelly with respect to the electrodes of the other set. In a detail D a suitable configuration of the interspaces between the electrodes is shown wherein the narrow interspaces 7, 17 result in lines N' that are actually too narrow to be visible. The enlarged interspaces 8, 18 as well as fields 9, 19, however, when a nonzero potential difference between the electrode set U and the electrode set L is applied, appear on the matrix display as dark lines X, Y representing the coordinate axes, which are crossed by short marker lines M, and the lines N enclosing bright measuring net fields F. Matrix boxes B that are enclosed between the lines N' represent the actual measuring points. Each measuring net field F preferably contains a number of matrix boxes B.

Time dependent signals, e.g. binary signals, under the normal static control of the LC matrix display are applied to each matrix box B via appropriate electrodes and a potential difference arises across the LC layer 3 (display activation). A zero potential difference at the chosen matrix box B exists when two equal electric signals are applied to the related upper and lower electrode. These chosen matrix boxes B of zero potential difference appear dark on the display. For the same electro-optical effect, all LC regions at the interspaces between the electrodes also appear dark.

Since matrix elements having a zero potential difference are visible due to their darkness and since for the same electro-optical effects, all interspaces between the electrodes also appear dark, FIG. 5 shows the strong dark lines of the measuring net and of the coordinate axes with shorter marking lines therefor. In FIG. 5 all other lines (N') representing the corresponding interspaces between the electrodes are too narrow to be visible. The marked coordinate axes and measuring net shown in FIG. 5 are actually formed within the LC layer 3 itself as a consequence of electro-optical effects. The potential difference across boxes B is different from zero unless some box B represents a measuring point. The measuring points also appear within the LC layer 3.

By the specific design of the LC matrix display it is achieved that the measuring net and the marked coordinate axes are formed in the LC layer itself, which completely eliminates any parallax of the measuring net when looking obliquely at a displayed measuring point, even at the largest achievable viewing angles; this is represented in FIG. 2. By the fact that the thickness of the LC layer 3 is practically about 50 times smaller than the width of the electrodes it is evident that the viewing angle is practically unlimited. This represents another advantage of the LC matrix display according to the invention.

What is claimed is:

1. A liquid crystal matrix display with an internal reflector including an upper glass plate, a lower glass plate, a liquid crystal layer with dichroic admixtures in the space between the upper and the lower glass plate, a set of mutually parallel transparent upper electrodes imbedded in an orientation deposit layer on the inner side of the upper glass plate and a set of mutually parallel metal lower electrodes imbedded in an orientation deposit layer on the inner side of the lower glass plate, wherein the upper electrodes are non-parallel with the lower electrodes, the improvement comprising a configuration of the upper and of the lower electrodes such that the width of the interspaces being situated on lines along which marked coordinate axes and lines of a measuring net should appear, is so large that said interspaces, due to the opacity of the LC when the matrix display is activated, become visible, and that the width of all other interspaces between the electrodes is so small that the opaque LC layer along said spaces is not visible.

2. A LC matrix display as claimed in claim 1, wherein said coordinate axes are crossed by regularly spaced markers, which are well visible as opaque regions at electrodeless fields which are formed by a recess of electrode margins in the middle portion of electrode strips of said upper and said lower electrode set, wherein said margins face each other along some of said narrow interspaces and said fields are regularly spaced.

* * * * *